E. G. TURNER.
TORSION METER.
APPLICATION FILED FEB. 7, 1914.
1,135,741.
Patented Apr. 13, 1915.
4 SHEETS—SHEET 1.
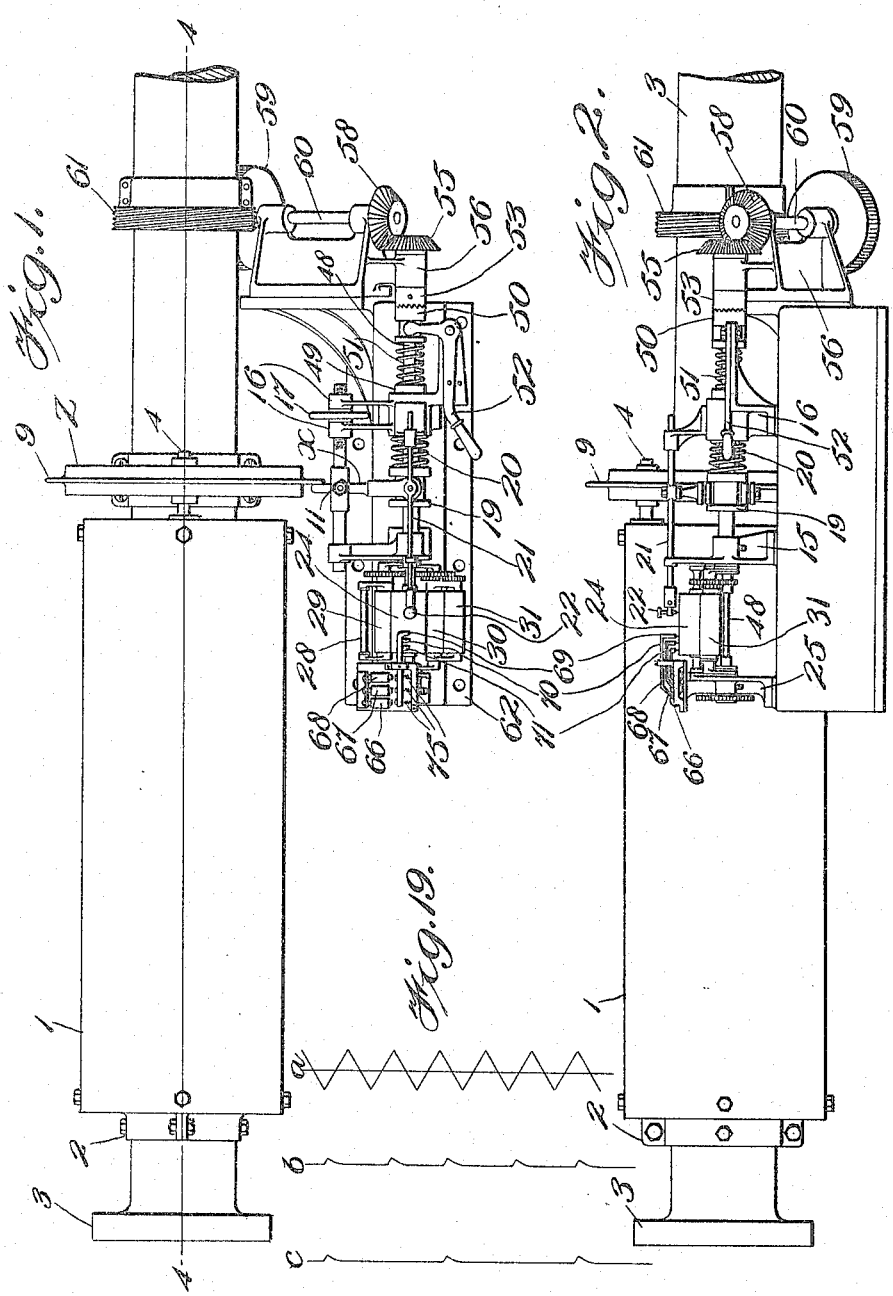
WITNESSES:
INVENTOR:

E. G. TURNER.
TORSION METER.
APPLICATION FILED FEB. 7, 1914.
1,135,741.
Patented Apr. 13, 1915.
4 SHEETS—SHEET 2.
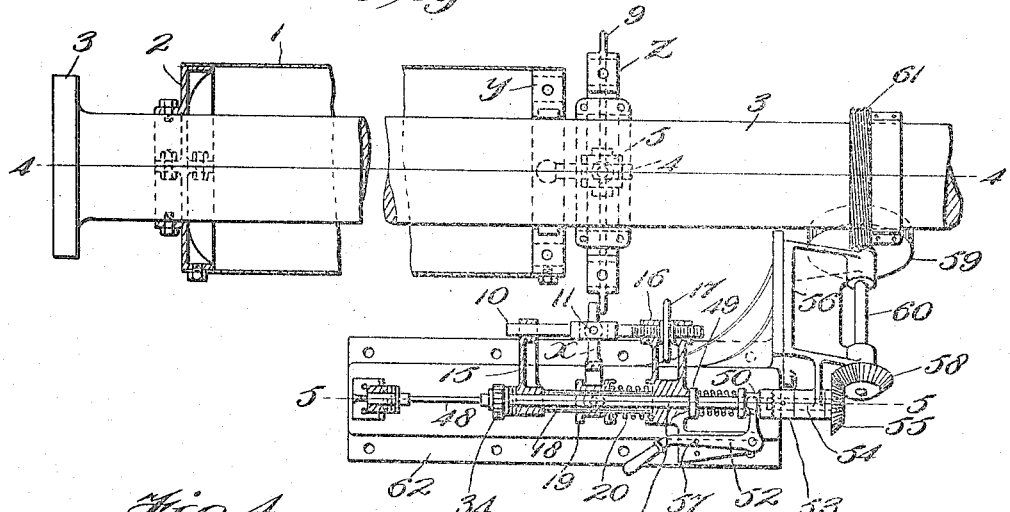
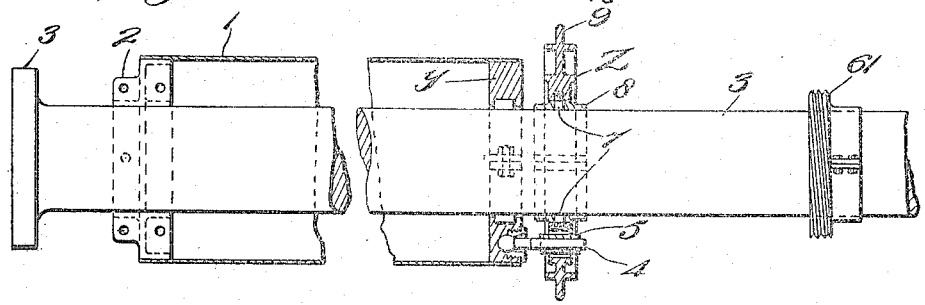
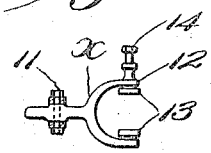
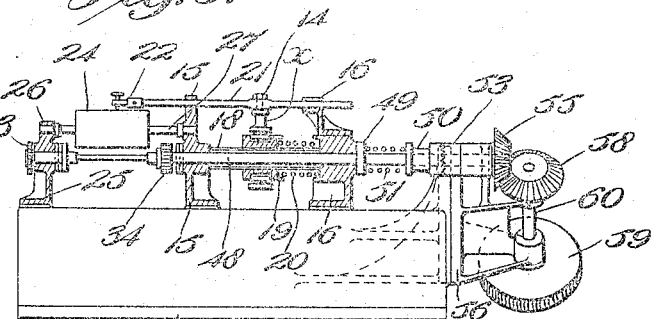
WITNESSES:
Byron B. Collings.
Helen A. Marston.
INVENTOR:
E. G. Turner

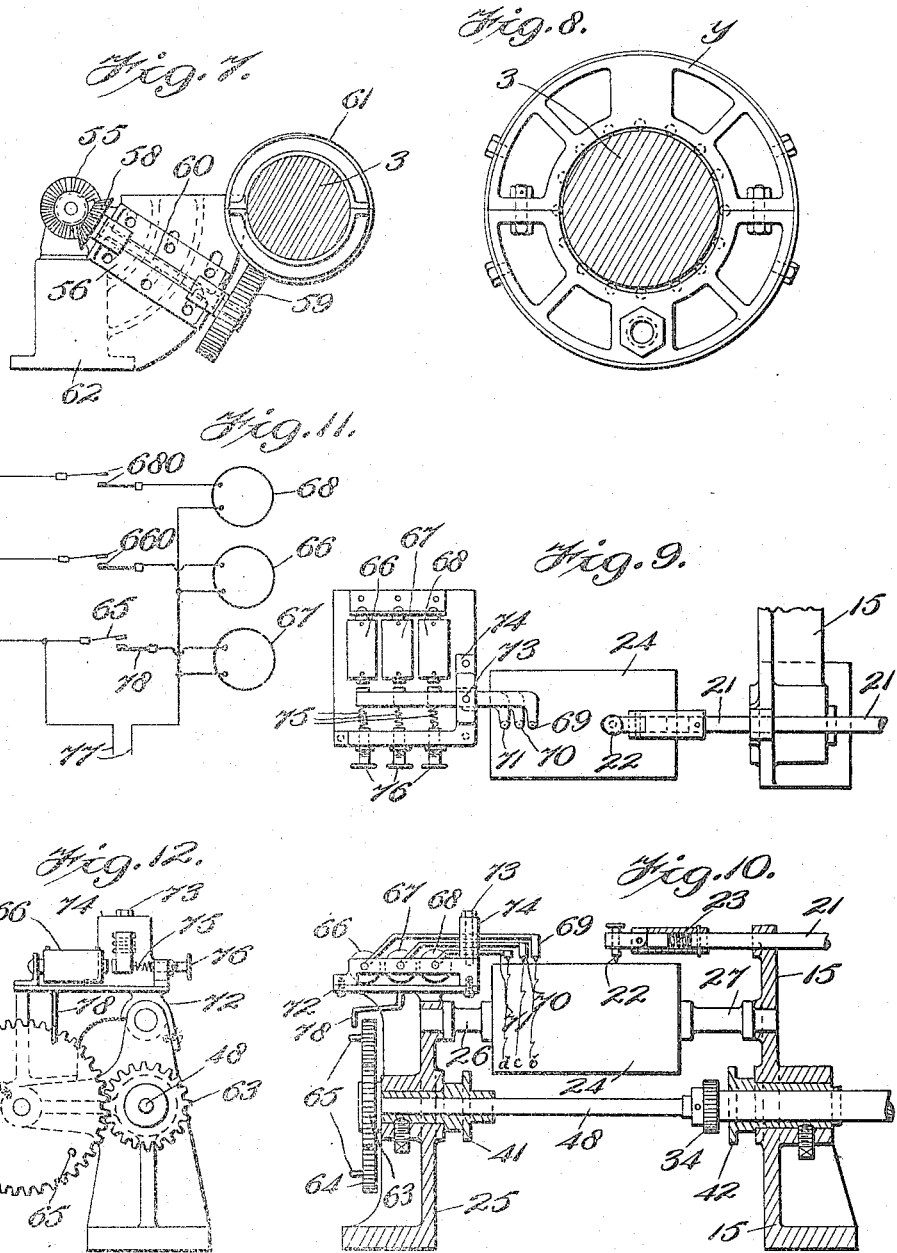

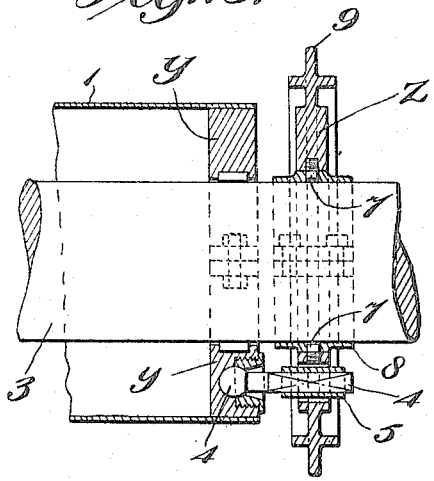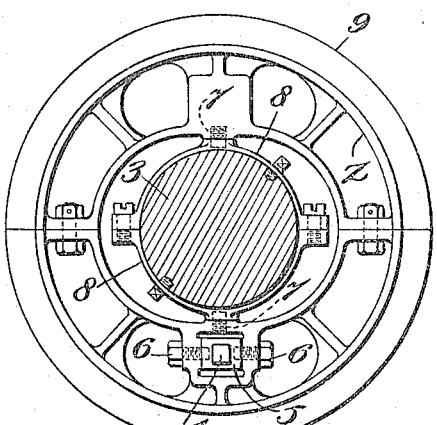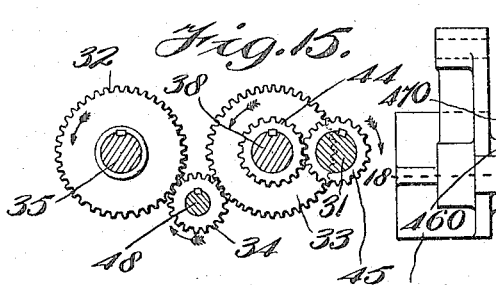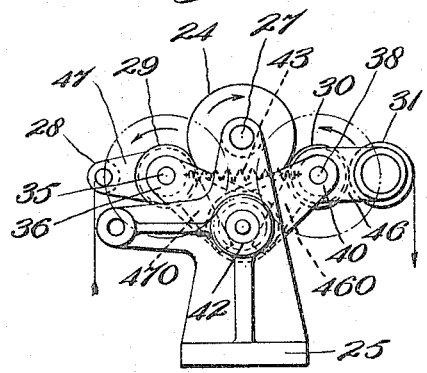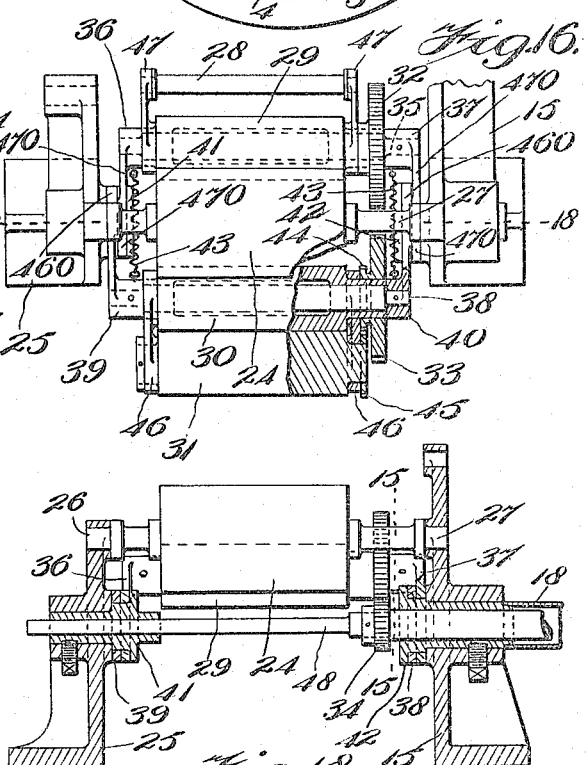

UNITED STATES PATENT OFFICE.

ERNEST G. TURNER, OF PHILADELPHIA, PENNSYLVANIA.

TORSION-METER.

1,135,741.  Specification of Letters Patent.  Patented Apr. 13, 1915.

Application filed February 7, 1914. Serial No. 817,282.

*To all whom it may concern:*

Be it known that I, ERNEST G. TURNER, a citizen of the United States, residing at Philadelphia, in the county of Philadelphia and State of Pennsylvania, have invented certain new and useful Improvements in Torsion-Meters; and I do hereby declare the following to be a full, clear, and exact description of the invention, such as will enable others skilled in the art to which it appertains to make and use the same.

This invention relates to improvements in torsion meters, adaptable to shafts in general, and has for its object to provide a continuous reading, self recording torsion meter and revolution indicator, which will be simple in construction, certain in action and more efficient in operation than those heretofore proposed.

With these and other objects in view, my invention consists in the novel details of construction and combinations of parts more fully hereinafter disclosed and particularly pointed out in the claims.

Referring to the accompanying drawings forming a part of this specification, in which like numerals and letters designate like parts in all the views:—Figure 1 is a plan view of a torsion meter made in accordance with my invention; Fig. 2 is an elevational view of the parts shown in Fig. 1; Fig. 3 is a plan view partly in section of the parts shown in Fig. 1; Fig. 4 is a section taken on the line 4—4 of Figs. 1 and 3; Fig. 5 is an elevational view partly in section taken along the line 5—5 of Fig. 3; Fig. 6 is a detail view of a lever shown in Fig. 5; Fig. 7 is an end elevation of the parts shown in Fig. 5; Fig. 8 is an enlarged detail end view of a bearing shown in Fig. 3; Fig. 9 is a plan view of certain parts shown in Fig. 10; Fig. 10 is an elevational view partly in section, showing my torque pointer and my three pointers; Fig. 11 is a diagram of the wiring for operating the magnets; Fig. 12 is an end elevational view of the parts shown in Fig. 10; Fig. 13 is a detail sectional view of the bearing and torque wheel shown in Fig. 4; Fig. 14 is a side elevational view of the torque wheel shown in Fig. 13; Fig. 15 is an elevational view on line 15—15 of Fig. 18 of the gears for moving the rollers; Fig. 16 is a plan view partly in section of the parts of Fig. 18; Fig. 17 is an end view of the parts shown in Fig. 18; Fig 18 is an elevational view partly in section, taken on the line 18—18 of Fig. 16 and showing the gears and levers for controlling the rollers for the paper; and Fig. 19, Sheet 1, is a diagrammatic view illustrating the character of the records made on the paper by the pencils or markers.

1 indicates a tube fixed tight at one end to the sleeve 2, which may be made in halves, bolted together and secured to the shaft 3, thus forming a solid connection between said tube 1 and shaft 3. The other end of the tube or pipe 1 is bolted to the roller bearing Y which is free to revolve over shaft 3. Rollers are preferably used to reduce as much as possible the friction between the shaft 3 and the bearing Y, when the shaft is subjected to torque. Since the pipe 1 will revolve but not twist to an appreciable extent, it will revolve accurately with the shaft at the point where it is fixed to the sleeve 2. Therefore from sleeve 2 to the bearing Y the shaft may revolve in said bearing for an amount equal to the torque without affecting said pipe 1.

In the bearing Y I provide a ball jointed arm 4 (see Figs. 1, 2, 3, 4, 13 and 14) square in cross section, which is fitted through the sleeve 5. Sleeve 5 is pivoted in the wheel Z by means of pins 6, as shown in Fig. 14, and the said sleeve consequently can move around these pins in a slot with which the wheel Z is provided. The wheel Z is preferably made in halves, bolted together for convenience in assembling the parts over shaft 3. The wheel Z is pivoted by means of pins 7, shown in Figs. 4, 13 and 14 to sleeve 8, which is also preferably made in halves bolted together, and secured to shaft 3. This construction permits the wheel Z to freely revolve within certain limits around pins 7.

When the shaft 3 is subjected to torque it will drag with it the sleeve 8 and wheel Z. The pipe 1 not being in torque will cause the wheel Z to pull on the arm 4, and the arm 4 being fixed at one end in the bearing Y, will cause the sleeve 5 to force the wheel Z to turn on its pivots 7, and to revolve with the shaft while occupying a plane inclined to the axis of said shaft. In thus revolving, the circumferential rim 9 of the wheel Z will be likewise inclined or pitched on one side or the other of its normal plane passing through the pins 7, depending on the direction of rotation of the main shaft 3, and the amount of this pitch will represent the amount of torque of the main shaft between the sleeve 2 and the sleeve 8, but this torque will be multiplied on account of the difference in length of the radii of the shaft 3 and rim 9. To increase this movement of the rim 9 even more, so as to make the reading clearer, lever X with a short and a long arm is provided. The lever X is pivoted to rod 10, by means of the bolt 11. The long arm of lever X has a fork 12, having rollers 13 and on one end of the fork is a pin 14. The rod 10 slides through brackets 15 and 16. The end of the rod 10 passing through bracket 16 is threaded and over this thread is adjusted the hand wheel 17 shown in Fig. 3, so by revolving the wheel 17, rod 10 is made to disconnect the lever X from the rim 9 of the wheel Y, when desired.

Between the brackets 15 and 16 a tube or pipe 18 is secured, while over this pipe the sleeve 19 is free to slide. Rollers 13, Fig. 6, fit in the groove of the sleeve 19; while between said sleeve 19 and bracket 16, the spring 20 is fitted over the pipe 18. Spring 20 will be compressed between sleeve 19 and bracket 16, thus forcing sleeve 19 to the left as seen in Fig. 3; and sleeve 19 will in turn through the fork 12, cause the shaft arm of the lever X to bear against the rim 9 of the wheel at all times.

When the wheel Z revolves in an inclined plane and the short arm of the lever X is bearing hard up against the rim 9, the fork end 12 and with it pin 14, slides back and forward over pipe 18 for a distance proportioned to the inclination of the plane of the wheel Z, multiplied by the difference of the arms of the lever X and thus serves to indicate the torsion.

The pin 14 carries with it the rod 21. Consequently the rod 21 will move back and forth on the paper, over distances corresponding to the movement of the sleeve 19. The rod 21 is supported and slides in brackets 15 and 16.

The rod 21 carries the pencil holder 22, shown in Fig. 5 and also in Figs. 9 and 10. This pencil holder is so made that the pencil can be hinged back, the small spring 23 keeping it in that position and also keeping the pencil on the roller 24 when working. Accordingly there is no chance of the pencil falling over when not in use and no chance of its not bearing on the paper when working. The roller 24, Figs. 5, 9 and 10, is held between brackets 25 and 15 and is free to revolve in its shaft bearings 26 and 27.

The paper is passed over the guide roller 28, seen in Figs. 16 and 17, and passed under the roller 29, thence over the roller 24, under the roller 30 and over the roller 31, dropping into an appropriate holder or cut off as required. The rollers 29 and 30 are driven by means of gears 32 and 33, Fig. 15, which mesh with the gear 34, consequently when the gear 34 revolves in the direction of the arrow, the gear 32 and roller 29, and the gear 33 with the roller 30, revolve in the directions and as indicated by the arrows. The gear 32 and roller 29 are supported by shaft 35, Fig. 16, which is held up by the levers 36 and 37, while the gear 33 and roller 30 are supported by the shaft 38, which is held up by the levers 39 and 40 as shown in Figs. 16 and 17. The levers 36 and 39 are held in bearing 41 and levers 37 and 38 are held in bearing 42, Fig. 18. Bearings 41 and 42 are concentric with driving gear 34. Levers 36, 37 38 and 39 are free to oscillate around bearings 41 and 42. The springs 43 are fixed to these levers causing the rollers 29 and 30 to bear up tight against the roller 24, so as to make the paper adhere closely around the roller 24.

As shown in Figs. 15 and 16, the rollers 30 and 31 carry gears 44 and 45. When the roller 30 is made to revolve, the gear 44 will revolve also and will cause the gear 45 to revolve and with it also the roller 31. It follows that the roller 31 revolves at the same speed as the roller 30, so that the paper will roll freely over the rollers and have a constant tension.

The roller 31 is supported by the levers 46, pivoted over the ends of the roller 30, each of which ends has a supporting arm 460, Fig. 16 and one of which supporting arms is shown in Fig. 17, and which arms bear against the bearings 41 and 42, as will be readily understood. Likewise the guide roller 28 is supported by the levers 47, each of which is pivoted over the ends of the roller 29, each of which ends has also a supporting arm 470, Fig. 16 and one of which is shown in Fig. 17, and which arms bear up against the bearings 41 and 42. In this manner the guide roller 28 and the roller 31 are always held by gravity in the same position in relation to the rollers 29 and 30.

Should it be desired to put the paper in the device it is passed over the guide roller 28, pulled down on levers 35 and 36, thus making a clearance between the rollers 29 and 24, so as to slip the paper between them. The paper is then passed over the roller 24 by pulling down on the levers 39 and 40, against the torsion of the springs 43. The paper is then passed between the rollers 24 and 30, and the friction between the rollers 30 and 31 will draw the paper through and over the roller 31.

The bearings 41 and 42, Fig. 10, are made fast by means of bolts to brackets 25 and 15, and in said bearings, the shaft 48 revolves. The shaft 48 carries the gear 34 which meshes with the gears 32 and 33 as explained above. The shaft 48 also carries other gears which will be explained below. The shaft 48 is supported by brackets 25, 15 and 16 as shown in Fig. 5, while passing through the pipe 18. The shaft 48 is held in position on one side of the brackets 15 by the gear 34, and on the other side of the bracket 16 by the collar 49. The clutch sleeve 50 slides freely over the shaft 48, and spring 51 is fixed between collar 49 and said clutch sleeve 50, forcing the sleeve into engagement with the clutch member 53, which is fixed solid to one end of the shaft 54, on the other end of which shaft the gear 55 is fixed. The shaft 54 is supported by the bracket 56.

The lever 52 as shown in Fig. 3, is kept in position by the pin 57. Clutch sleeve 50 and clutch member 53 are meshed together, so when the shaft 54 revolves, the shaft 48 revolves also. By pulling out the lever 52 I disconnect the clutch so that the shaft 54 can revolve freely and the shaft 48 will be stationary. The lever 52 is kept in open position by the pin 57 transposed into another hole in the support. The gear 55 meshes with the gear 58, which is keyed to shaft 60, having on its other end the worm gear wheel 59. The gears 58 and 59 are supported in the bracket 56, which is made to revolve around the center of the shaft 54, thus permitting me to change the gear 59. The bracket 56 is attached to the bed plate 62, to which bed plate is fixed, the brackets 25, 15 and 16.

The gear or worm wheel 59 meshes with the worm 61, which is conveniently made in halves and bolted together for assembling. The worm 61 is bolted on to the shaft 3. Consequently, when the shaft 3 revolves the worm 61 will revolve and cause the gears 59, 58 and 55 to revolve, and if the clutch is connected the gear 34 and gears 32, 33, 44 and 45 will also revolve. But I can disconnect the worm wheel 59 from the worm 61 along the shaft by sliding the latter, thus disconnecting the whole device from the main shaft 3. I can also by opening the clutch disconnect the parts; and by bringing the lever X away from the rim of the torque wheel Z, I can again disconnect the meter. The revolution of the device can be changed by substituting a larger or smaller worm wheel 59, by changing the gears 34, 32 and 33, making 34 small and 32 and 33 larger, or making 34 larger and 32 and 33 smaller.

On the shaft 48 there is a fixed gear 63, which meshes with the gear 64. Attached to the gear 64 there are one or more insulated contacts 65 which complete the circuit, (at every revolution or part of a revolution of this gear), with an insulated contact 78, attached to the frame 25 of the machine. These contacts Figs. 10, 11 and 12 momentarily close the electric circuit of the magnet 67, causing the arm 70 to be drawn suddenly to the magnet. Upon the interruption of the circuit, due to the contact being broken upon the rotation of the gear 64, one of the small springs 75 returns the arm 70 to its original position. This operation causes a break or notch in the line "c", Fig. 19, as will be presently explained.

It will be noted that the ratio of the gears 63 and 64 may be changed at will to suit any desired number of revolutions or a series of gears may be put in their place so that one revolution of the gear 64 may be made to indicate on line "c" for any of the number of revolutions of the main shaft, such for example as every 25, 50, 75, 100, 200 or more revolutions as desired.

The circuit for the electro-magnet 68, is brought through two contacts 680, Fig. 11, located in the handle of a holder or other similar device containing a stop watch. A momentary pressure on this handle brings the two contacts together thus completing the circuit for the electro-magnet 68 and at the same time starting the stop watch. A second pressure on the handle again closes the circuit of the electro-magnet 68 and at the same time stops the stop watch. Each time the circuit of this magnet is closed the arm 71 is actuated and makes a mark on the line "d", Fig. 19, similar and in like manner to the notch on the line "c" described above. The object of this arrangement is to obtain the total revolutions of the shaft during a given time, such for example as an engine shaft on a ship when the total number of revolutions made over a measured course, is desired. The stop watch and magnet being operated simultaneously at the beginning and at the end of the measured course.

The electro-magnet 66 is connected in the circuit with a clock containing electric contacts 660, or in circuit with a chronometer operating an electric relay, so arranged that the circuit through the magnet is closed every ½ or whole second. This magnet, in connection with the lever 69 and the pencil carried by the same, makes a notched mark on the paper. Each time the circuit is completed, thus indicating seconds or half seconds as the case may be.

The three arms 69, 70 and 71, operated by the magnets 66, 67 and 68 all operate as previously described for arm 70.

It will be noted that the three electro-magnets 66, 67 and 68, are supported by a bracket attached to the plate 72, and that the levers 69, 70 and 71, are pivoted by bolt 73 in bracket 74. The three arms or levers are provided with pencil carriers so arranged that the points of the pencils rest on the roller and trace the lines "b", "c" and "d", Fig. 19, when the roller 24 is in motion. These pencils trace a straight line on the paper passing over roller 24 at all times except when the circuits of the electro-magnets are momentarily closed when the corresponding lever or arm is attached thereby making a break or notch in the line. The springs 75 and adjusting screws 76 return the levers or arms to their normal position immediately on opening or breaking the electric circuit controlling any energized magnet.

In order to make clear the operation of my invention it is said:—On making an engine trial, and especially one on a naval ship, where trials are made during given periods, I employ a stop watch in the manner above indicated, whereupon the device will mark on the same paper by means of the electric connections, the beginning and the end of this period of the trial.

The zigzag line marked $a$ in Fig. 19, will be traced by the pencil holder 22, and will indicate the twist of the shaft for every revolution. The line $b$ will give between its notches definite periods of time such as half seconds and one seconds, so that the number of twist lines indicated at $a$ may be counted between these periods. The line indicated at $c$ will give the number of revolutions for the period which may be, say one hundred or two hundred. It therefore follows that if we count the number of notches on line $b$ occurring between two notches on the line $c$, we know at once that a certain number of seconds have elapsed for a given number of revolutions of the shaft. We thus have a correct reading of the conditions of the twist of the shaft carrying a ship's propeller, for example, for a given number of revolutions of said shaft in a given time, and during a fixed period, and thus can facilitate the calculations for figuring the strength of the shaft. The amount of twist being measured and the tensile strength of the shaft being known, and the revolutions being thus indicated, the shaft horse power can be obtained. The paper can be fed at any desired speed to accommodate any particular type of engine, by simply changing the gears which feed the said paper.

It will thus be seen that my invention provides first, a means of obtaining a continuous reading of the twist of the shaft such as 3, and of marking the amount of the twist on a strip of paper carried by a roller. Second, owing to the fact that the bearing Y and its coacting parts may be slid along the shaft, my invention provides a means of obtaining the twist of a shaft over the various lengths thereof, and also a means for multiplying the indications of this twist. Third, my invention provides a means of obtaining a continuous reading of the twist of a shaft at various speeds, because the gears may be interchanged as above mentioned. Fourth, since the circuit can be made and broken as above described, my invention also provides a means of obtaining the above readings at given intervals of time, and also of obtaining such readings for a given number of revolutions of a shaft as well as of obtaining a reading for a required period of time. It will further be seen that important features of my invention are found in the wheel Z pivoted at two points 7, on the sleeve 8, carried by the shaft, the twist of which is to be measured, and permitting said wheel to revolve in a plane inclined to said shaft. A second important feature of my invention resides in the rod 4, and its associated parts. A still further feature of my invention resides in the pipe 1, fixed at one end to the sleeve 2 and associated with the bearing Y at the other end, thus enabling the rod 4 to move while the pipe 1 is stationary. Other important features of my invention reside in the means for transposing the angular rotation of the wheel Z to the sleeve 19 and to the pencil holder 22, as well as the means of multiplying this motion. I further regard the ready means of disconnecting the parts as an important feature of my invention, as well as the means of holding the lever X against the rim 9 of the wheel Z. It is a convenient feature of my invention to be able to disconnect the parts through the end lever 52 and clutch member 50. Other important features of my invention will be appreciated by those skilled in the art.

It is obvious that those skilled in the art may vary the details of construction as well as the arrangement of parts without departing from the spirit of my invention, and therefore I do not wish to be limited to the above disclosure except as may be required by the claims.

What I claim is:—

1. In a torsion meter the combination of a tube adapted to be fixed at one end to the shaft whose torsion is to be measured; a bearing surrounding said shaft associated with the other end of said tube; a wheel fixed on said shaft adapted to rotate in a plane inclined to the axis of the shaft; a connection between said wheel and bearing; and means associated with said wheel for indicating the torsion of said shaft between said wheel and fixed end of said tube, substantially as described.

2. In a torsion meter the combination of a tube adapted to be fixed at one end to a rotating shaft and provided with a bearing through which said shaft passes at its other end; a sleeve secured to said shaft; a wheel pivoted to said sleeve; a connection between said bearing and wheel adapted to cause said wheel to assume a position inclined to the axis of said shaft when the latter is subjected to torsion; a lever coacting with said wheel; and means associated with said lever for indicating the torsion of said shaft, substantially as described.

3. In a torsion meter the combination of a tube adapted to be fixed to a rotating shaft at one end and provided with a bearing at pipe 18. The shaft 48 is held in position on one side of the brackets 15 by the gear 34, and on the other side of the bracket 16 by the collar 49. The clutch sleeve 50 slides freely over the shaft 48, and spring 51 is fixed between collar 49 and said clutch sleeve 50, forcing the sleeve into engagement with the clutch member 53, which is fixed solid to one end of the shaft 54, on the other end of which shaft the gear 55 is fixed. The shaft 54 is supported by the bracket 56.

The lever 52 as shown in Fig. 3, is kept in position by the pin 57. Clutch sleeve 50 and clutch member 53 are meshed together, so when the shaft 54 revolves, the shaft 48 revolves also. By pulling out the lever 52 I disconnect the clutch so that the shaft 54 can revolve freely and the shaft 48 will be stationary. The lever 52 is kept in open position by the pin 57 transposed into another hole in the support. The gear 55 meshes with the gear 58, which is keyed to shaft 60, having on its other end the worm gear wheel 59. The gears 58 and 59 are supported in the bracket 56, which is made to revolve around the center of the shaft 54, thus permitting me to change the gear 59. The bracket 56 is attached to the bed plate 62, to which bed plate is fixed, the brackets 25, 15 and 16.

The gear or worm wheel 59 meshes with the worm 61, which is conveniently made in halves and bolted together for assembling. The worm 61 is bolted on to the shaft 3. Consequently, when the shaft 3 revolves the worm 61 will revolve and cause the gears 59, 58 and 55 to revolve, and if the clutch is connected the gear 34 and gears 32, 33, 44 and 45 will also revolve. But I can disconnect the worm wheel 59 from the worm 61 along the shaft by sliding the latter, thus disconnecting the whole device from the main shaft 3. I can also by opening the clutch disconnect the parts; and by bringing the lever X away from the rim of the torque wheel Z, I can again disconnect the meter. The revolution of the device can be changed by substituting a larger or smaller worm wheel 59, by changing the gears 34, 32 and 33, making 34 small and 32 and 33 larger, or making 34 larger and 32 and 33 smaller.

On the shaft 48 there is a fixed gear 63, which meshes with the gear 64. Attached to the gear 64 there are one or more insulated contacts 65 which complete the circuit, (at every revolution or part of a revolution of this gear), with an insulated contact 78, attached to the frame 25 of the machine. These contacts Figs. 10, 11 and 12 momentarily close the electric circuit of the magnet 67, causing the arm 70 to be drawn suddenly to the magnet. Upon the interruption of the circuit, due to the contact being broken upon the rotation of the gear 64, one of the small springs 75 returns the arm 70 to its original position. This operation causes a break or notch in the line "$c$", Fig. 19, as will be presently explained.

It will be noted that the ratio of the gears 63 and 64 may be changed at will to suit any desired number of revolutions or a series of gears may be put in their place so that one revolution of the gear 64 may be made to indicate on line "$c$" for any of the number of revolutions of the main shaft, such for example as every 25, 50, 75, 100, 200 or more revolutions as desired.

The circuit for the electro-magnet 68, is brought through two contacts 680, Fig. 11, located in the handle of a holder or other similar device containing a stop watch. A momentary pressure on this handle brings the two contacts together thus completing the circuit for the electro-magnet 68 and at the same time starting the stop watch. A second pressure on the handle again closes the circuit of the electro-magnet 68 and at the same time stops the stop watch. Each time the circuit of this magnet is closed the arm 71 is actuated and makes a mark on the line "$d$", Fig. 19, similar and in like manner to the notch on the line "$c$" described above. The object of this arrangement is to obtain the total revolutions of the shaft during a given time, such for example as an engine shaft on a ship when the total number of revolutions made over a measured course, is desired. The stop watch and magnet being operated simultaneously at the beginning and at the end of the measured course.

The electro-magnet 66 is connected in the circuit with a clock containing electric contacts 660, or in circuit with a chronometer operating an electric relay, so arranged that the circuit through the magnet is closed every $\frac{1}{2}$ or whole second. This magnet, in connection with the lever 69 and the pencil carried by the same, makes a notched mark on the paper. Each time the circuit is completed, thus indicating seconds or half seconds as the case may be.

The three arms 69, 70 and 71, operated by the magnets 66, 67 and 68 all operate as previously described for arm 70.

It will be noted that the three electro-magnets 66, 67 and 68, are supported by a bracket attached to the plate 72, and that the levers 69, 70 and 71, are pivoted by bolt 73 in bracket 74. The three arms or levers are provided with pencil carriers so arranged that the points of the pencils rest on the roller and trace the lines "$b$", "$c$" and "$d$", Fig. 19, when the roller 24 is in motion. These pencils trace a straight line on the paper passing over roller 24 at all times except when the circuits of the electro-magnets are momentarily closed when the corresponding lever or arm is attached thereby making a break or notch in the line. The springs 75 and adjusting screws 76 return the levers or arms to their normal position immediately on opening or breaking the electric circuit controlling any energized magnet.

In order to make clear the operation of my invention it is said:—On making an engine trial, and especially one on a naval ship, where trials are made during given periods, I employ a stop watch in the manner above indicated, whereupon the device will mark on the same paper by means of the electric connections, the beginning and the end of this period of the trial.

The zigzag line marked $a$ in Fig. 19, will be traced by the pencil holder 22, and will indicate the twist of the shaft for every revolution. The line $b$ will give between its notches definite periods of time such as half seconds and one seconds, so that the number of twist lines indicated at $a$ may be counted between these periods. The line indicated at $c$ will give the number of revolutions for the period which may be, say one hundred or two hundred. It therefore follows that if we count the number of notches on line $b$ occurring between two notches on the line $c$, we know at once that a certain number of seconds have elapsed for a given number of revolutions of the shaft. We thus have a correct reading of the conditions of the twist of the shaft carrying a ship's propeller, for example, for a given number of revolutions of said shaft in a given time, and during a fixed period, and thus can facilitate the calculations for figuring the strength of the shaft. The amount of twist being measured and the tensile strength of the shaft being known, and the revolutions being thus indicated, the shaft horse power can be obtained. The paper can be fed at any desired speed to accommodate any particular type of engine, by simply changing the gears which feed the said paper.

It will thus be seen that my invention provides first, a means of obtaining a continuous reading of the twist of the shaft such as 3, and of marking the amount of the twist on a strip of paper carried by a roller. Second, owing to the fact that the bearing Y and its coacting parts may be slid along the shaft, my invention provides a means of obtaining the twist of a shaft over the various lengths thereof, and also a means for multiplying the indications of this twist. Third, my invention provides a means of obtaining a continuous reading of the twist of a shaft at various speeds, because the gears may be interchanged as above mentioned. Fourth, since the circuit can be made and broken as above described, my invention also provides a means of obtaining the above readings at given intervals of time, and also of obtaining such readings for a given number of revolutions of a shaft as well as of obtaining a reading for a required period of time. It will further be seen that important features of my invention are found in the wheel Z pivoted at two points 7, on the sleeve 8, carried by the shaft, the twist of which is to be measured, and permitting said wheel to revolve in a plane inclined to said shaft. A second important feature of my invention resides in the rod 4, and its associated parts. A still further feature of my invention resides in the pipe 1, fixed at one end to the sleeve 2 and associated with the bearing Y at the other end, thus enabling the rod 4 to move while the pipe 1 is stationary. Other important features of my invention reside in the means for transposing the angular rotation of the wheel Z to the sleeve 19 and to the pencil holder 22, as well as the means of multiplying this motion. I further regard the ready means of disconnecting the parts as an important feature of my invention, as well as the means of holding the lever X against the rim 9 of the wheel Z. It is a convenient feature of my invention to be able to disconnect the parts through the end lever 52 and clutch member 50. Other important features of my invention will be appreciated by those skilled in the art.

It is obvious that those skilled in the art may vary the details of construction as well as the arrangement of parts without departing from the spirit of my invention, and therefore I do not wish to be limited to the above disclosure except as may be required by the claims.

What I claim is:—

1. In a torsion meter the combination of a tube adapted to be fixed at one end to the shaft whose torsion is to be measured; a bearing surrounding said shaft associated with the other end of said tube; a wheel fixed on said shaft adapted to rotate in a plane inclined to the axis of the shaft; a connection between said wheel and bearing; and means associated with said wheel for indicating the torsion of said shaft between said wheel and fixed end of said tube, substantially as described.

2. In a torsion meter the combination of a tube adapted to be fixed at one end to a rotating shaft and provided with a bearing through which said shaft passes at its other end; a sleeve secured to said shaft; a wheel pivoted to said sleeve; a connection between said bearing and wheel adapted to cause said wheel to assume a position inclined to the axis of said shaft when the latter is subjected to torsion; a lever coacting with said wheel; and means associated with said lever for indicating the torsion of said shaft, substantially as described.

3. In a torsion meter the combination of a tube adapted to be fixed to a rotating shaft at one end and provided with a bearing at its other end; the pivoted wheel associated with said shaft; a connection between said wheel and bearing; a lever associated with said wheel; and a recording means controlled by said lever; substantially as described.

4. In a torsion meter the combination of a collar adapted to be secured to a shaft; a tube rigid with said collar at one end; a bearing rigid with said tube at its other end; a rod having a universal joint connection with said bearing; a collar adapted to be secured to said shaft; a wheel pivoted to said collar; and an adjustable connection between said wheel and said rod, substantially as described.

In testimony whereof I affix my signature, in presence of two witnesses.

ERNEST G. TURNER.

Witnesses:
 WALTER GUMMEY,
 M. J. HEKKING.

Copies of this patent may be obtained for five cents each, by addressing the "Commissioner of Patents, Washington, D. C."